United States Patent
Khoreva et al.

(10) Patent No.: US 12,437,515 B2
(45) Date of Patent: Oct. 7, 2025

(54) DEVICE AND METHOD FOR GENERATING TRAINING DATA FOR A MACHINE LEARNING SYSTEM

(71) Applicant: Robert Bosch GmbH, Stuttgart (DE)

(72) Inventors: Anna Khoreva, Stuttgart (DE); Edgar Schoenfeld, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 602 days.

(21) Appl. No.: 17/943,987

(22) Filed: Sep. 13, 2022

(65) Prior Publication Data

US 2023/0091396 A1    Mar. 23, 2023

(51) Int. Cl.

| | |
|---|---|
| *G06V 10/774* | (2022.01) |
| *G06N 3/045* | (2023.01) |
| *G06V 10/764* | (2022.01) |
| *G06V 10/776* | (2022.01) |
| *G06V 10/82* | (2022.01) |
| *G06V 20/70* | (2022.01) |

(52) U.S. Cl.
CPC ........... *G06V 10/774* (2022.01); *G06N 3/045* (2023.01); *G06V 10/764* (2022.01); *G06V 10/776* (2022.01); *G06V 10/82* (2022.01); *G06V 20/70* (2022.01)

(58) Field of Classification Search
CPC .. G06V 10/774; G06V 10/764; G06V 10/776; G06V 10/82; G06V 20/70; G06N 3/045; G06N 3/09; G06N 3/0464; G06N 3/047; G06N 3/0475; G06N 3/094

USPC .......................................................... 382/157
See application file for complete search history.

(56) References Cited

U.S. PATENT DOCUMENTS

| | | | |
|---|---|---|---|
| 2020/0026996 A1* | 1/2020 | Kolter | G06N 3/047 |
| 2020/0320777 A1* | 10/2020 | Meshry | G06N 3/082 |
| 2021/0118099 A1* | 4/2021 | Kearney | A61B 6/5217 |
| 2022/0269980 A1* | 8/2022 | Keren | G06V 10/82 |

OTHER PUBLICATIONS

Amendments received before examination for EP 21198499 date Oct. 20, 2022 (Year: 2022).*

(Continued)

*Primary Examiner* — Juan A Torres
(74) *Attorney, Agent, or Firm* — NORTON ROSE FULBRIGHT US LLP (57) ABSTRACT

A computer-implemented method for training a first machine learning system which is configured to generate an output characterizing a label map of an image. The method includes: providing first and second inputs, the first input characterizing a binary vector characterizing respective presences or absences of classes from a plurality of classes, and the second input characterizing a randomly drawn value; determining, by a first generator, an output based on the first and second inputs, the output characterizing a first label map, wherein the first label map characterizes probabilities for the classes from the plurality of classes; determining a representation of the first label map using a global pooling operation; training the first machine learning system based on a loss function, wherein the loss function characterizes an F1 loss, wherein the F1 loss characterizes a difference between the first input and the representation of the first label map.

13 Claims, 6 Drawing Sheets

(56) References Cited

OTHER PUBLICATIONS

European search opinion for EP 21198499 date Mar. 22, 2022. (Year: 2022).*
Amended claims filed after receipt of (European) search report for EP 21198499 date Oct. 20, 2022. (Year: 2022).*
Le Moing et al., "Semantic Palette: Guiding Scene Generation With Class Proportions," Cornell University, 2021, pp. 1-17. <https://arxiv.org/pdf/2106.01629.pdf> Downloaded Sep. 12, 2022.
Mirza et al., "Conditional Generative Adversarial Nets," Cornell University, 2014, pp. 1-7. <https://arxiv.org/pdf/1411.1784.pdf> Downloaded Sep. 12, 2022.
Wei et al., "Learn To Segment Retinal Lesions and Beyond," Cornell University, 2019, pp. 1-13.
Maiza, "The Unknown Benefits of Using a SOFT-F1 Loss in Classification Systems," Towards Data Science, 2019, pp. 1-22.
Baghel et al., "Opal-Net: A Generative Model for Part-Based Object Layout Generation," Cornell University, 2020, pp. 1-13.
Cheng et al., "Controllable Image Synthesis Via Segvae," ECCV 2020, LNCS 12352, 2020, pp. 159-174.
Anonymous, "Sorensen-Dice Coefficient," Wikipedia, 2022, pp. 1-6.

* cited by examiner

DEVICE AND METHOD FOR GENERATING TRAINING DATA FOR A MACHINE LEARNING SYSTEM

CROSS REFERENCE

The present application claims the benefit under 35 U.S.C. § 119 of European Patent Application No. EP 21 19 8499.2 filed on Sep. 23, 2021, which is expressly incorporated herein by reference in its entirety.

FIELD

The present invention concerns a method for training a machine learning system, a method for determining a dataset using the machine learning system, a method for training a second machine learning system using the dataset, a machine learning system, a computer program and a machine-readable storage device.

BACKGROUND INFORMATION

Le Moing et al. "Semantic Palette: Guiding Scene Generation with Class Proportions", Jun. 3, 2021 arxiv.org/pdf/2106.01629.pdf describes a method for training a machine learning system to generate label maps and images.

Machine learning systems are increasingly used in almost all fields of technology. Typically, these statistical models are the enabling technology for a variety of applications, e.g., autonomous vehicles such as cars, drones, or ships.

A performance of a machine learning system, i.e., its ability to accurately predict a desired result, e.g., a desired classification, of a provided datum, e.g., an image, crucially depends on the data the machine learning system has been trained with. For example, if a machine learning system for classifying objects in the vicinity of a vehicle was not trained with images taken at night, the performance of the machine learning system cannot be expected to accurately classify images taken at night.

A similar situation arises for data, which is uncommon in the dataset. Staying with the example from above, even if a few night images are comprised in the training dataset, the performance of the machine learning system can still not be expected to accurately classify images taken at night.

This is a considerable problem, especially for safety critical applications such as autonomous vehicles. Rare or uncommon events in the real world may only be sparsely characterized by the training data or, worse, may not even be characterized by the training data at all. This phenomenon is also known as the long-tail problem with data characterizing rare or uncommon events also being referred to as edge cases or corner cases. Collecting data of all such events relevant for a machine learning system is all but impossible. However, in order to design a safe autonomous system that behaves correctly in even such rare events one needs to be able to provide data of such events during training of the machine learning system.

Common methods rely on generative adversarial networks (also known as GANs) to synthesize data, typically in addition to data collected in the real world in order to increase the training data of a machine learning system. However, conventional GANs are trained with data collected in the real world. That means that rare events observed in the real world are rare in the training data of a respective GAN as well. The problem about this is that GANs are known to drop underrepresented (or unobserved) modes of the dataset. This phenomenon is also known as mode drop or mode collapse in GANs. The dropped modes could be semantic categories or combinations of semantic categories that occur or co-occur rarely or never. Hence, it is desirable to devise a method to encourage GANs to generate images of rare or unseen combinations of objects/semantic categories, i.e., a method to combat mode drop.

An advantage of a method according to the present invention is that a GAN is trained such that it is encouraged to not drop underrepresented modes in the training data of the GAN. This allows for generating images and corresponding semantic segmentations and/or instance segmentations of even rare classes of the training dataset.

SUMMARY

In a first aspect, the present invention concerns a computer-implemented method for training a first machine learning system, wherein the first machine learning system is configured to generate an output signal characterizing a label map of an image. According to an example embodiment of the present invention, the method comprises the steps of:

Providing a first input and a second input, wherein the first input characterizes a binary vector characterizing respective presences or absences of classes from a plurality of classes and wherein the second input characterizes a randomly drawn value;

Determining, by a first generator of the first machine learning system, an output based on the first input and the second input, wherein the output characterizes a first label map, wherein the first label map characterizes probabilities for the classes from the plurality of classes;

Determining a representation of the first label map by means of a global pooling operation;

Training the first machine learning system based on a loss function, wherein the loss function characterizes an F1 loss, wherein the F1 loss characterizes a difference between the first input and the representation of the first label map.

The first generator may be understood as a generator of a generative adversarial network (also known as GAN), wherein the first machine learning system may be understood as either the GAN itself or as comprising the GAN.

According to an example embodiment of the present invention, the generator is configured to accept the first input and second input as input of the generator and determine a label map. A label map may be understood as a semantic segmentation and/or an instance segmentation. Preferably, the GAN comprising the first generator is a first GAN used in a two-stage process, wherein the first GAN is configured to determine a label map and the second GAN is configured to determine an image based on the label map such that the label map characterizes a semantic segmentation and/or instance segmentation of the image.

A label map may preferably be given in the form of a three-dimensional tensor, wherein a height dimension and a width dimension characterize pixel positions of pixels in an image corresponding to the label map and a depth dimension characterizes a classification of a respective pixel. The classification may, for example, be given in the form of a one-hot vector or an integer if a label map is used as, e.g., training data. If a label map is predicted from, e.g., the first generator, the classifications characterized by the label map may also be given as a vector of probabilities for each class.

According to an example embodiment of the present invention, the GAN comprising the first generator may preferably comprise a first discriminator, wherein the first discriminator is used for training the first generator in the method. The first input and second input may preferably characterize vectors. The first input may preferably characterize a vector of binary values characterizing presence or absence of certain classes in a label map to be generated by the generator based on the first input and the second input. This may be understood such as that the first input may be used to steer the output of the first generator with respect to what classes a user desires in the output. The second input is preferably a vector of randomly drawn values. The first and second vector may preferably be concatenated into a single vector in order to serve as input of the first generator.

The first generator may especially be a neural network. A StyleGAN or StyleGAN-2 architecture is especially favorable to be used as first generator. However, other architectures may also be used for the first generator, especially those based on the StyleGAN or StyleGAN-2 architecture.

The first input used for training may especially be determined based on a training dataset of the first machine learning system. The training dataset may comprise label maps characterizing class labels. From these label maps, an indicator vector may be determined, wherein the indicator vector indicates for a label map the presence or absence of the classes comprised in the label maps of the training dataset. An indicator vector may especially be given in the form of a binary vector, i.e., a vector comprising only zeros and/or ones, and a binary vector may be understood as indicator vector. Indicator vectors characterizing duplicates of other indicator vectors may then be discarded and the remaining unique indicator vectors may be used for training the first generator. For example, the steps of the method may be repeated iteratively and a first vector may be sampled from the unique indicator vectors in each iteration. Each indicator vector may carry a same probability for sampling. The probability for each indicator vector may, however, also be based on a frequency of occurrence of the indicator vector among all indicator vectors obtained for the label maps before discarding.

Alternatively or additionally, the machine learning system may be trained based on first inputs derived from the indicator vectors. Preferably, the first machine learning system is trained based on a plurality of first inputs, wherein the steps are carried out for each first input from the plurality of first inputs and wherein the plurality of first inputs comprise first inputs that characterize combinations of presences and absences of the classes, which are not observed in the label maps of the training dataset or are rarely observed in the training dataset.

According to an example embodiment of the present invention, scarcity of class combinations in an indicator vector may be determined based on clustering the obtained indicator vectors. One could then sample the first inputs such that each cluster has equal probability of providing an indicator vector as first input. It is also possible to determine indicator vectors, which are not present in the plurality of indicator vectors and provide one of these indicator vectors as the first input. It is also possible to sample the values of rare or unobserved indicator vectors. For example, from the indicator vectors determined from the training dataset, one could determine an occurrence of classes in the indicator vectors, i.e., count for each class how often the class occurs in a label map of the training dataset. The values of an indicator vector may then be sampled, wherein the probability of each class is determined based on an inverse of the occurrence of the class in the training dataset. It is also possible to set the probability to a value greater than 0 only for a predefined amount of classes having the lowest occurrence in training dataset, e.g., the 20% of classes from the plurality of classes having a lowest occurrence count in the indicator vectors obtained for the training dataset.

The inventors found that introducing indicator vectors into training the first machine learning model, which are rare or not observed in the training dataset, advantageously further mitigates mode dropping when training the first machine learning system.

According to an example embodiment of the present invention, the first generator and first discriminator may especially be configured such that the GAN is a conditional GAN, for example as a conditional GAN as proposed by Mirza & Osindero "Conditional Generative Adversarial Nets", 2014, https://arxiv.org/pdf/1411.1784.pdf. The first generator and the first discriminator may, e.g., be configured according to the auxiliary-classifier GAN (also known as AC-GAN) architecture, wherein an auxiliary classifier of the AC-GAN is configured to predict binary values characterizing presence or absence of classes from the plurality of classes and wherein the first input serves as label to, e.g., a binary cross entropy loss, wherein the binary cross entropy loss compares an output of the source classifier with the first input. In principle, the first generator and first discriminator could be configured such that they resemble any conventional conditional GAN architecture.

Compared to conventional training procedures of conditional GANs, however, the proposed method comprises new steps, which advantageously mitigate mode drop when training the first machine learning system. The output determined by the first generator for the first input and the second input characterizes the first label map, wherein in another step of the method the first label map is processed by a global pooling operation, wherein the pooling operation may especially operate along the width and height dimension of the label map, i.e., it may pool the classifications comprised in the first label map. Preferably, a global max pooling operation is used as global pooling operation. This way, the representation of the label map characterizes a maximum probability for each class from the plurality of classes. The representation may then be used in the F1 loss.

The F1 loss may especially be used as an additional loss when training the GAN, e.g., in addition to a GAN loss, which would otherwise be used for training the GAN if it was not trained to mitigate mode collapse. This may be achieved by adding the F1 loss to the GAN loss. It is also possible to multiply the F1 loss with a predetermined factor before adding it to the GAN loss, thereby scaling the F1 loss. The predetermined factor may be understood as a hyperparameter for training the first machine learning system.

An advantage of the F1 loss is that it regularizes the training of the first machine learning model. The first generator is incentivized to not drop rare or uncommon modes and is also incentivized to put at least some probability mass into regions of the input space, which are not covered by the training dataset (e.g., regions of indicator vectors not present in the training dataset). This mitigates mode collapse.

Preferably, the F1 loss is a macro F1 loss, preferably a double-sided macro soft F1 loss. The double-sided macro soft F1 loss may be characterized by the formulae:

$$\mathcal{L}_{F1} = -\frac{F1^{(1)} + F1^{(0)}}{2},$$

-continued $$F1^{(1)} = \frac{2TP}{2TP + FP + FN},$$

$$F1^{(0)} = \frac{2TP}{2TN + FN + FP},$$

$$TP = \sum_{n=1}^{N} \hat{y}_n y_n,$$

$$FP = \sum_{n=1}^{N} \hat{y}_n (1 - y_n),$$

$$FN = \sum_{n=1}^{N} (1 - \hat{y}_n) y_n,$$

$$TN = \sum_{n=1}^{N} (1 - \hat{y}_n)(1 - y_n),$$

wherein N is the number of classes in an indicator vector, $\hat{y}_n$ is the n-th element of the representation determined from the first generator, and $y_n$ is the n-th element of the first input.

According to an example embodiment of the present invention, preferably, the first machine learning system further comprises a second generator, wherein the second generator is configured for determining an image based on a label map determined from the first generator.

The second generator may be understood as part of a second GAN of the first machine learning system. The inventors found that an OASIS model may preferably be used as second GAN.

An advantage of the second generator is that the first machine learning system can generate both label maps and corresponding images based on the first input and second input. It is hence very easy to create a dataset for semantic segmentation task and/or instance segmentation tasks by sampling first inputs and second inputs as described above and determine respective label maps and images from them. Likewise, a test dataset for segmentation task and/or instance segmentation tasks may be generated. As the first generator is trained to mitigate mode collapse, the generated dataset is advantageously more diverse.

In another aspect, the present invention hence concerns a computer-implemented method for determining a training dataset and/or test dataset comprising pairs of images and label maps, wherein determining at least one pair of image and label map comprises the steps of:
  Generating a label map from a first machine learning system, wherein the first machine learning system is provided based on the training method according to the first aspect;
  Determining an image based on the label map.

The term "the first machine learning system is provided based on the training method" may be understood as the first machine learning system being obtained after training using the training method of the first aspect. In other words, the provided first machine learning model derives from the training method according to the first aspect. Alternatively, the training process, e.g., the steps of an embodiment according to the first aspect, may also be part of the method for training the second machine learning system.

The image may especially be determined by the second generator.

In another aspect, the present invention concerns a computer-implemented method for training a second machine learning system, wherein the second machine learning system is configured to determine an output signal characterizing a label map and wherein the second machine learning system is trained using a training dataset and/or wherein the second machine learning system is tested using a test dataset, wherein the training dataset and/or test dataset has been determined according to the method for determining the training dataset and/or the test dataset.

As the generated training dataset and/or testing dataset is more diverse and rare modes are not dropped, a prediction performance of the second machine learning system is advantageously increased by the training dataset. Likewise, as the test dataset models images and corresponding label maps to be expected during inference time of the second machine learning system better, a generalization performance of the second machine learning system can be estimated with higher precision. This allows for assessing the feasibility of the second machine learning system for the intended task especially with respect to a generalization capability of the second machine learning system.

In another aspect, the present invention concerns a computer-implemented method for determining a control signal of an actuator and/or a display, wherein the control signal is determined based on an output signal determined from a second machine learning system, wherein the second machine learning system has been trained with the method according to the previous aspect.

Example embodiments of the present invention will be discussed with reference to the figures in more detail.

DETAILED DESCRIPTION OF EXAMPLE EMBODIMENTS

Figure 1:
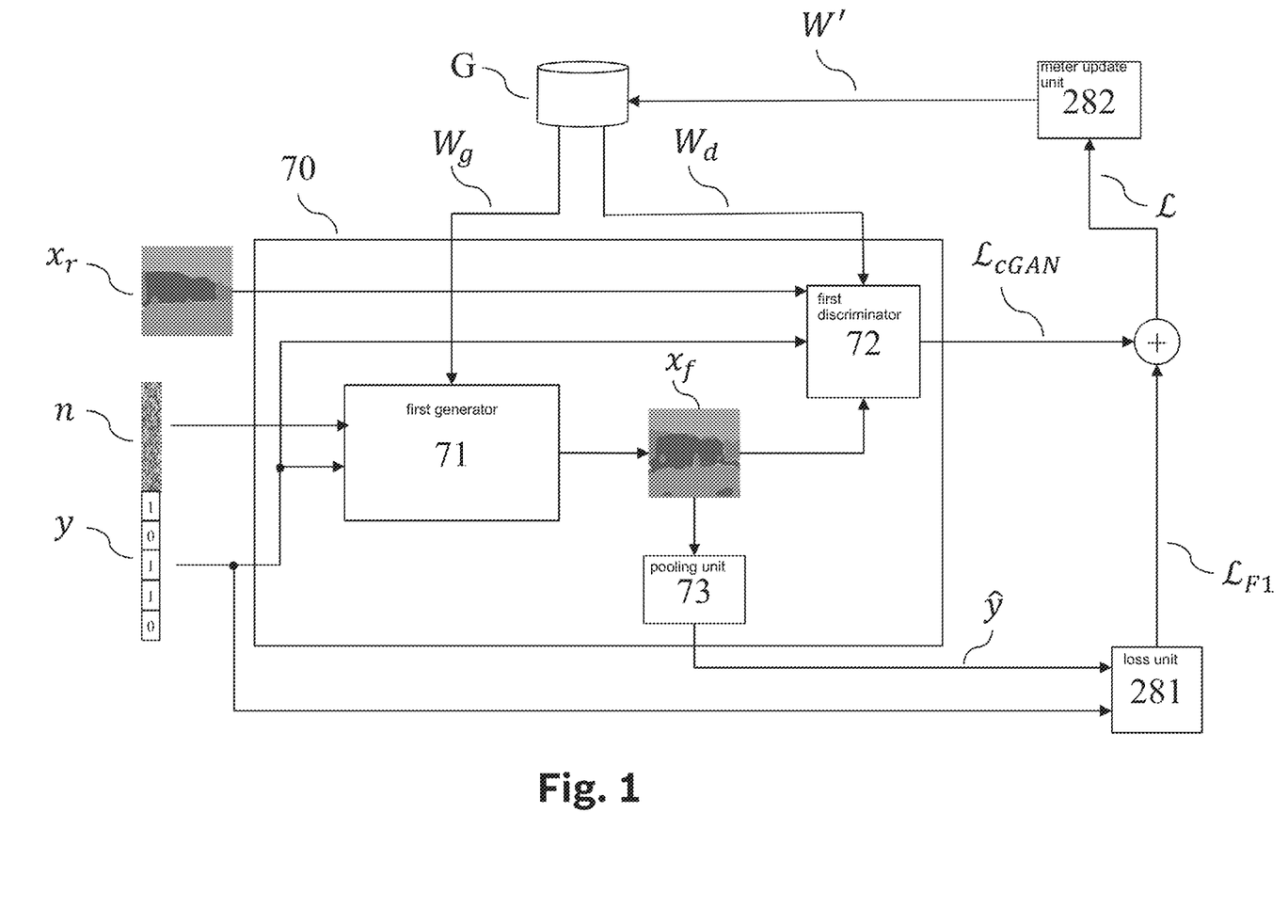
FIG. 1 shows a training method for training a first machine learning system, according to an example embodiment of the present invention.

FIG. 1 depicts a training of a first machine learning system (70), wherein the first machine learning system (70) characterizes a conditional GAN. The first machine learning system (70) comprises a first generator (71) and a first discriminator (72). The first generator (71) is provided parameters ($W_g$) from a data storage unit (G). The data storage unit (G) also provides parameters ($W_d$) to the first discriminator (72). The first generator (71) and the first discriminator (72) may preferably be a neural network respectively, preferably a generator and a discriminator according to the StyleGAN-2 architecture with a conditional loss.

For training, the machine learning system (70) is provided a training label map ($x_r$), a first input (y) characterizing an indicator vector of classes to be generated by the first generator (71) and a second input (n) characterizing randomly drawn values. The first input (y) and the second input (n) may both be given in the form of a vector respectively. The vectors may be concatenated to serve as input to the first generator (71). Based on the input, the first generator (71) determines an output ($x_f$) characterizing a label map. The output ($x_f$), the training label map ($x_r$) and the first input (y) may then be provided as input to the first discriminator (72). Based on this input, the discriminator determines a first loss ($\mathcal{L}_{cGAN}$), wherein the first loss ($\mathcal{L}_{cGAN}$) characterizes a loss used for training a conditional GAN.

The output ($x_f$) is further processed by a pooling unit (73), which is configured to determine a representation ($\hat{y}$) characterizing a global pooling of the output ($x_f$). The pooling unit (73) may preferably perform a global max pooling in order to determine the representation ($\hat{y}$) from the output ($x_f$). The representation ($\hat{y}$) and the first input (y) are then forwarded to a loss unit (281), which is configured to determine an F1-loss based on the representation ($\hat{y}$) and the first input (y). The loss unit (281) preferably determines an F1-loss according to the formulae:

$$\mathcal{L}_{F1} = -\frac{F1^{(1)} + F1^{(0)}}{2},$$

$$F1^{(1)} = \frac{2TP}{2TP + FP + FN},$$

$$F1^{(0)} = \frac{2TP}{2TN + FN + FP},$$

$$TP = \sum_{n=1}^{N} \hat{y}_n y_n,$$

$$FP = \sum_{n=1}^{N} \hat{y}_n (1 - y_n),$$

$$FN = \sum_{n=1}^{N} (1 - \hat{y}_n) y_n,$$

$$TN = \sum_{n=1}^{N} (1 - \hat{y}_n)(1 - y_n).$$

The first loss ($\mathcal{L}_{cGAN}$) and the F1-loss ($\mathcal{L}_{F1}$) may then be added in order to determine a total loss ($\mathcal{L}$). The total loss ($\mathcal{L}$) may then be provided to a parameter update unit (282), which is configured to determine new parameters (W') for the first generator (71) and the first discriminator (72). The parameter update unit (282) may preferably determine the new parameters (W') by means of automatic differentiation.

The process depicted in FIG. 1 may be understood as a single step of gradient descent for training the first machine learning system (70). Preferably, multiple steps of gradient descent are run for training the first machine learning system (70). For each step, the training label map ($x_r$) may be sampled from a plurality of training label maps, wherein the plurality of training label maps characterizes a training dataset of the first machine learning system (70). The first input (y) and the second input (n) may also be sampled for each step of training. The first input (y) may especially be sampled from a plurality of first inputs characterizing indicator vectors of label maps of the training dataset. Additionally, the first input (y) may also be sampled based on an empirical probability of each element of the indicator vectors or an inverse of the empirical probability of each element of the indicator vectors.

Figure 2:
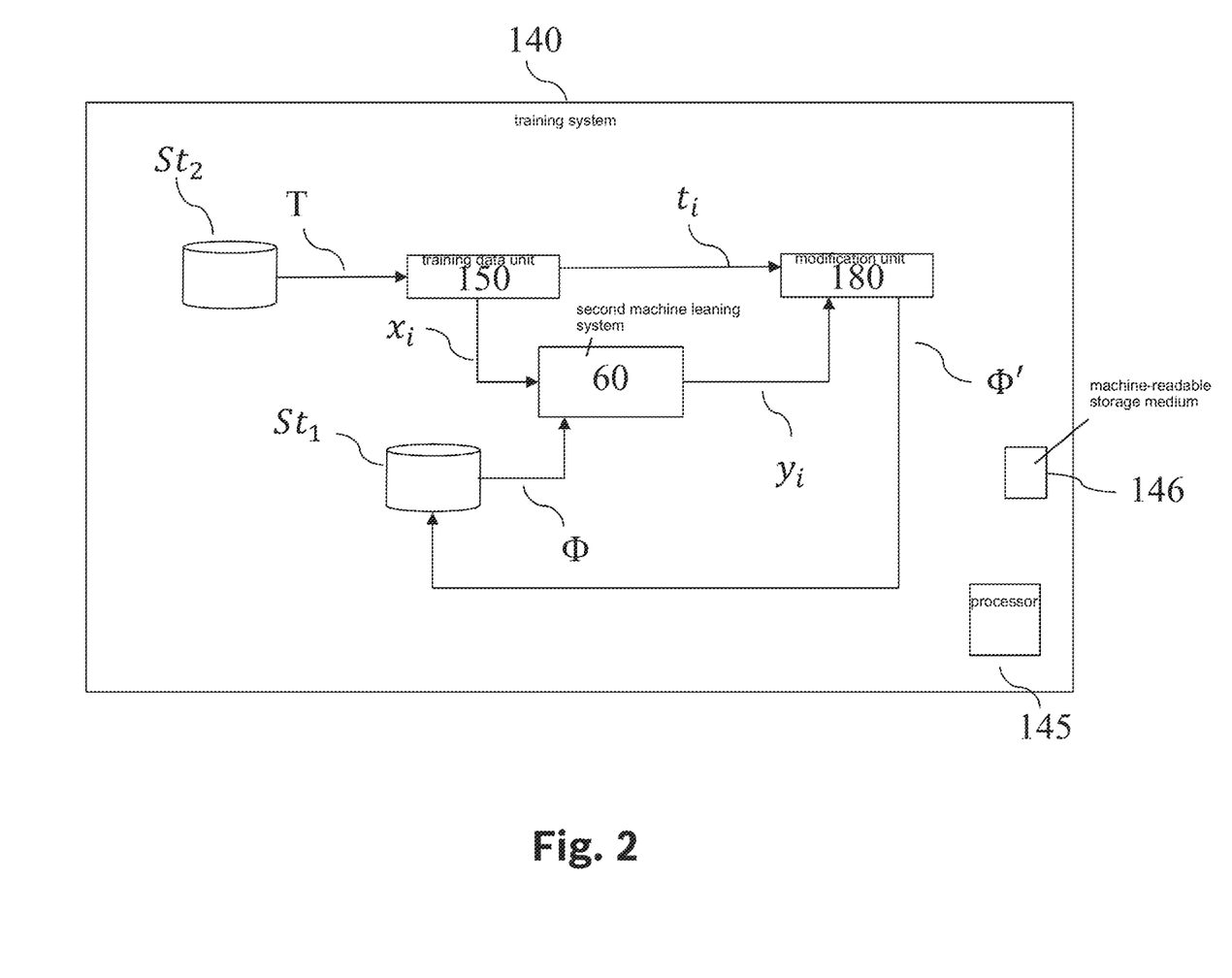
FIG. 2 shows a training system for training a second machine learning system, according to an example embodiment of the present invention.

FIG. 2 shows an embodiment of a training system (140) for training a second machine learning system (60) of the control system (40) by means of a training data set (T). The training data set (T) comprises a plurality of input signals ($x_i$) which characterize images and are used for training the second machine learning system (60), wherein the training data set (T) further comprises, for each input signal ($x_i$), a desired output signal ($t_i$) which corresponds to the input signal ($x_i$) and characterizes a label map of the input signal ($x_i$). At least some of the desired output signals ($t_i$) are determined by the first generator (71) after training. The input signals ($x_i$) corresponding to the desired output signals ($t_i$) determined by the first generator (71) are preferably determined by a second generator (not shown) based on the respective desired output signals ($t_i$).

For training, a training data unit (150) accesses a computer-implemented database ($St_2$), the database ($St_2$) providing the training data set (T). The training data unit (150) determines from the training data set (T) preferably randomly at least one input signal ($x_i$) and the desired output signal ($t_i$) corresponding to the input signal ($x_i$) and transmits the input signal ($x_i$) to the second machine learning system (60). The second machine learning system (60) determines an output signal ($y_i$) based on the input signal ($x_i$).

The desired output signal ($t_i$) and the determined output signal ($y_i$) are transmitted to a modification unit (180).

Based on the desired output signal ($t_i$) and the determined output signal ($y_i$), the modification unit (180) then determines new parameters ($\Phi'$) for the second machine learning system (60). For this purpose, the modification unit (180) compares the desired output signal ($t_i$) and the determined output signal ($y_i$) using a loss function. The loss function determines a first loss value that characterizes how far the determined output signal ($y_i$) deviates from the desired output signal ($t_i$). In the given embodiment, a negative log-likehood function is used as the loss function. Other loss functions are also possible in alternative embodiments.

The modification unit (180) determines the new parameters ($\Phi'$) based on the first loss value. In the given embodiment, this is done using a gradient descent method, preferably stochastic gradient descent, Adam, or AdamW. In further embodiments, training may also be based on an evolutionary algorithm or a second-order method for training neural networks.

In other preferred embodiments, the described training is repeated iteratively for a predefined number of iteration steps or repeated iteratively until the first loss value falls below a predefined threshold value. Alternatively or additionally, it is also possible that the training is terminated when an average first loss value with respect to a test or validation data set falls below a predefined threshold value. In at least one of the iterations the new parameters ($\Phi'$) determined in a previous iteration are used as parameters ($\Phi$) of the second machine learning system (60).

Furthermore, the training system (140) may comprise at least one processor (145) and at least one machine-readable storage medium (146) containing instructions which, when executed by the processor (145), cause the training system (140) to execute a training method according to one of the aspects of the present invention.

Figure 3:
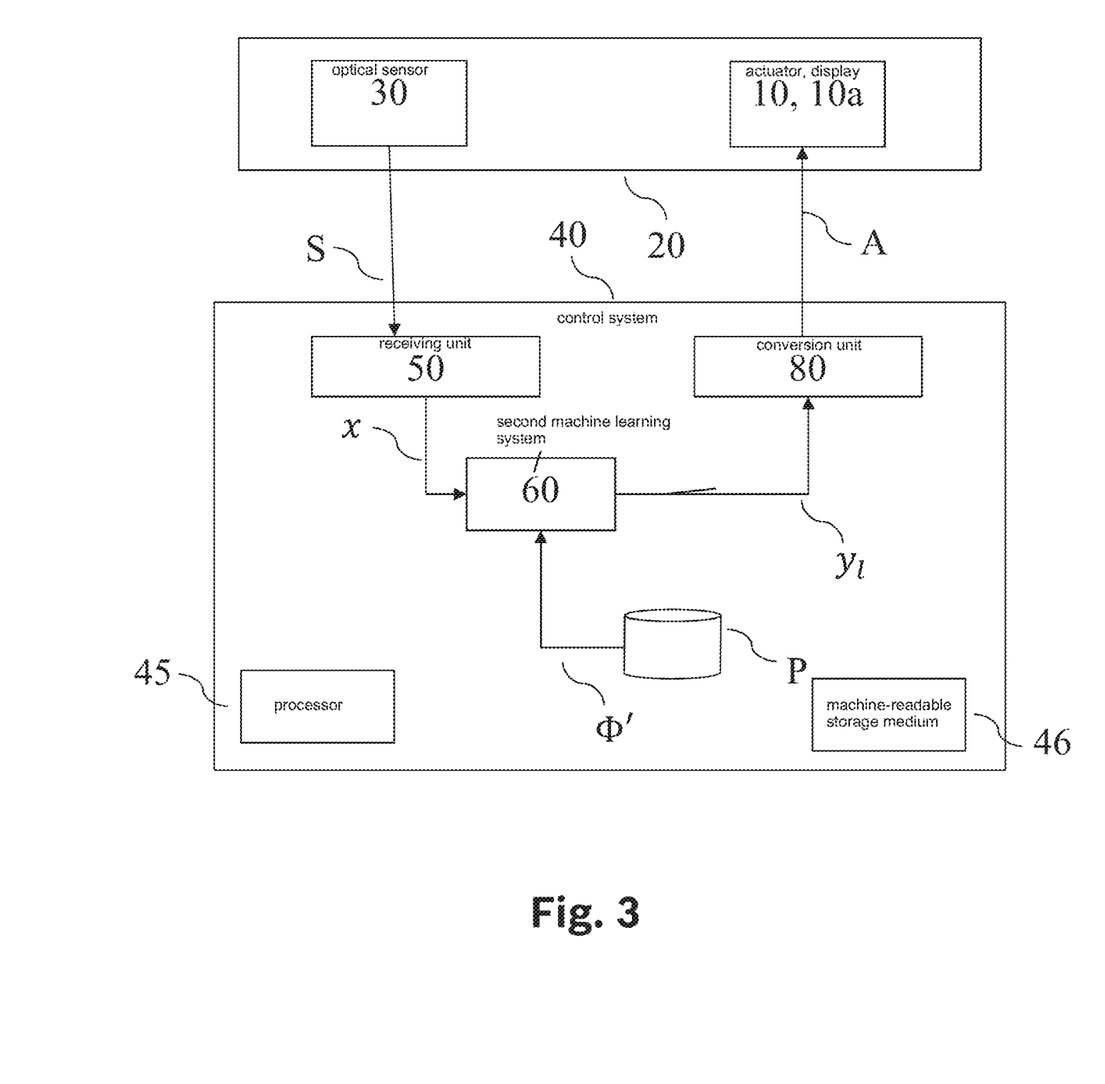
FIG. 3 shows a control system comprising a classifier controlling an actuator in its environment, according to an example embodiment of the present invention.

FIG. 3 shows an embodiment of an actuator (10) in its environment (20). The actuator (10) interacts with a control system (40). The actuator (10) and its environment (20) will be jointly called actuator system. At preferably evenly spaced points in time, an optical sensor (30) senses a condition of the actuator system. The optical sensor (30) may comprise several sensors.

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input signals (x). Alternatively, in case of no receiving unit (50), each sensor signal (S) may directly be taken as an input signal (x). The input signal (x) may, for example, be given as an excerpt from the sensor signal (S). Alternatively, the sensor signal (S) may be processed to yield the input signal (x). In other words, the input signal (x) is provided in accordance with the sensor signal (S).

The input signal (x) is then passed on to the second machine learning system (60).

The second machine learning system (60) is parametrized by parameters (Φ), which are stored in and provided by a parameter storage ($St_1$).

The second machine learning system (60) determines an output signal ($y_t$) from the input signals (x). The output signal ($y_t$) comprises information that assigns one or more labels to the input signal (x). The output signal ($y_t$) is transmitted to an optional conversion unit (80), which converts the output signal ($y_t$) into the control signals (A). The control signals (A) are then transmitted to the actuator (10) for controlling the actuator (10) accordingly. Alternatively, the output signal ($y_t$) may directly be taken as control signal (A).

The actuator (10) receives control signals (A), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 4:
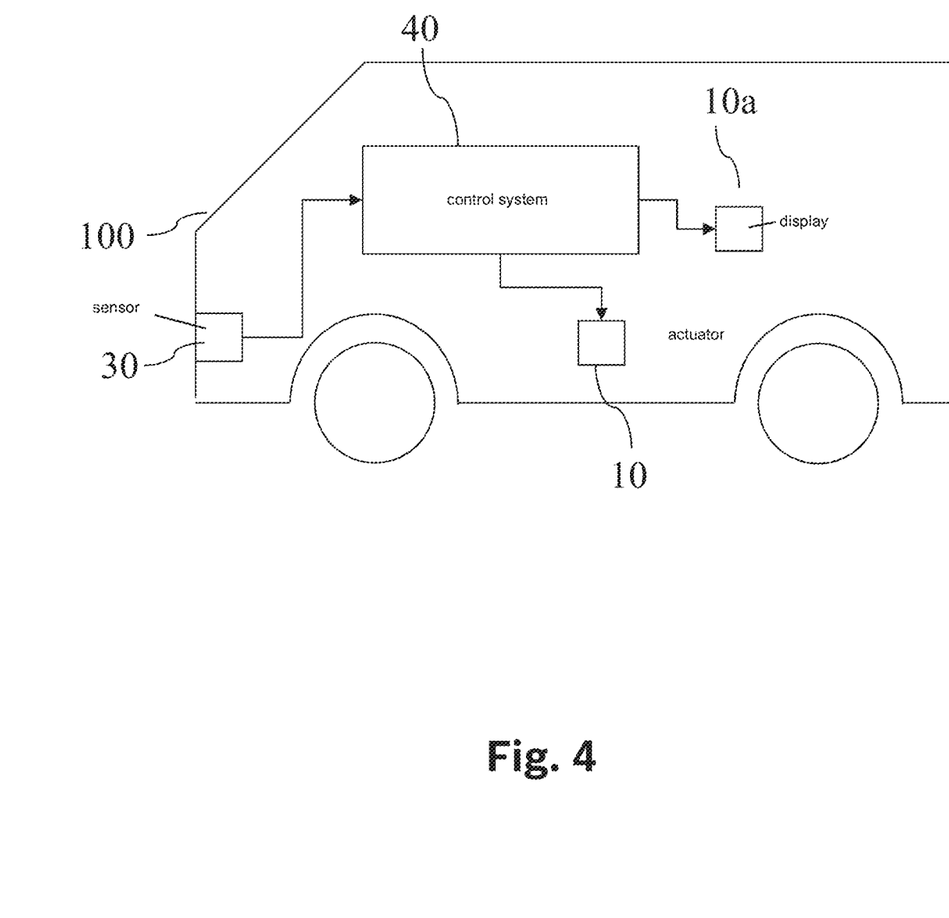
FIG. 4 shows the control system controlling an at least partially autonomous robot, according to an example embodiment of the present invention.

FIG. 4 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (100).

The input image (x) may hence display surroundings of the vehicle (100) and the output signal ($y_t$) may characterize a semantic segmentation and/or instance segmentation of the surroundings. The semantic segmentation and/or instance segmentation may especially characterize classifications of other road users, stationary elements such as buildings or signs, and roads or drivable grounds. The conversion unit (80) may then, e.g., determine a route such that the vehicle travels on ground classified as drivable by the output signal ($y_t$) while not colliding with other elements in the environment (20) of the vehicle (100). The control signal (A) may then be determined in accordance with this information.

The actuator (10), which is preferably integrated in the vehicle (100), may be given by a brake, a propulsion system, an engine, a drivetrain, or a steering of the vehicle (100).

Alternatively or additionally, the control signal (A) may also be used to control the display (10a), e.g., for displaying the objects detected by the second machine learning system (60). It can also be imagined that the control signal (A) may control the display (10a) such that it produces a warning signal if the vehicle (100) is deviating from a save route through the environment as determined by the conversion unit (80). The warning signal may be a warning sound and/or a haptic signal, e.g., a vibration of a steering wheel of the vehicle.

In further embodiments, the at least partially autonomous robot may be given by another mobile robot (not shown), which may, for example, move by flying, swimming, diving, or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, a control signal (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine. The control signal (A) may then be determined depending on a detected material of the laundry.

Figure 5:
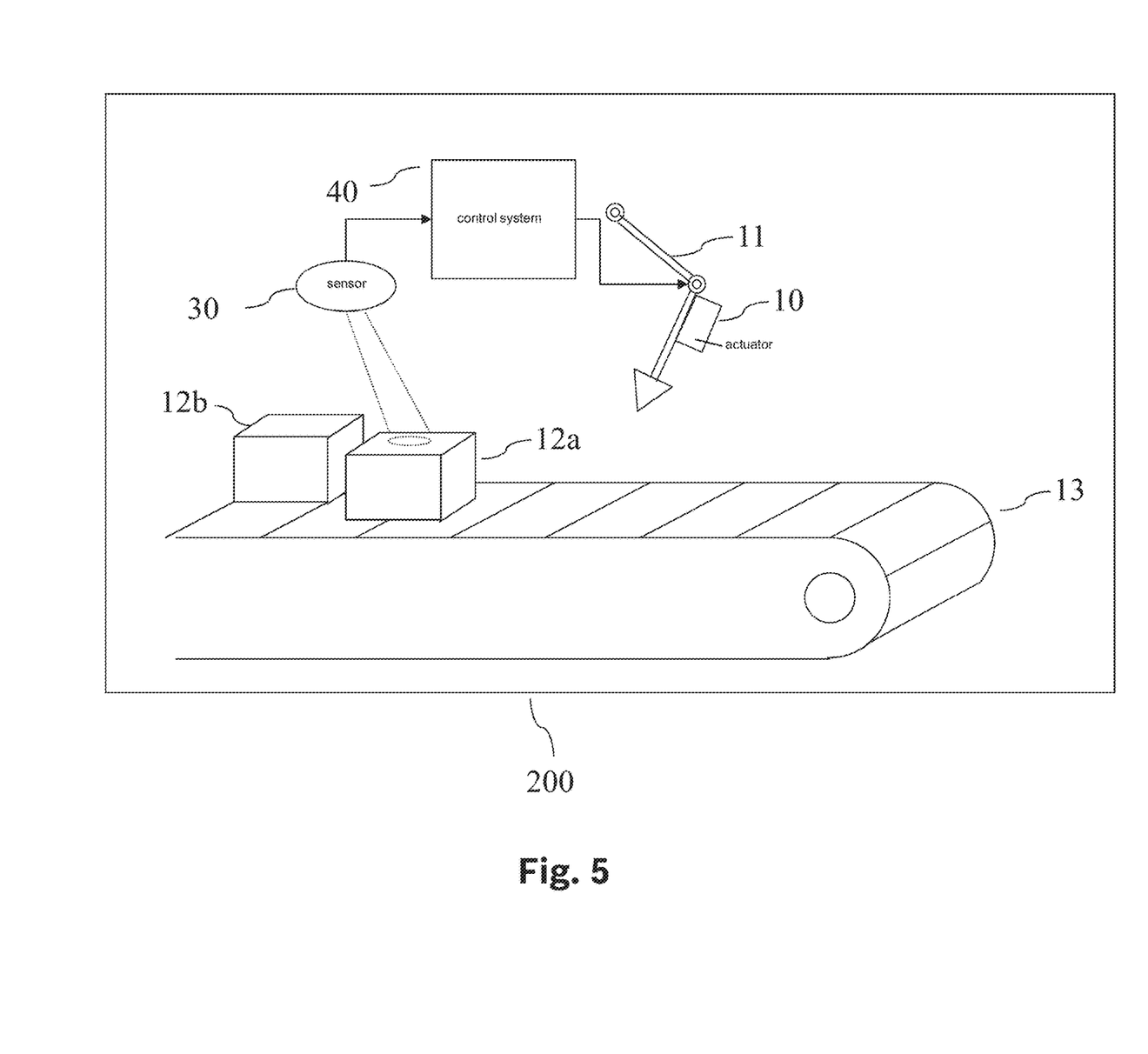
FIG. 5 shows the control system controlling a manufacturing machine, according to an example embodiment of the present invention.

FIG. 5 shows an embodiment in which the control system (40) is used to control a manufacturing machine (11), e.g., a punch cutter, a cutter, a gun drill or a gripper, of a manufacturing system (200), e.g., as part of a production line. The manufacturing machine (11) may comprise a transportation device, e.g., a conveyer belt or an assembly line (13) (emphasis added) (see 37 CFR 184(p)(5)), which moves a manufactured product (12a and 12b). The control system (40) controls an actuator (10), which in turn controls the manufacturing machine (11).

The sensor (30) may be given by an optical sensor which captures properties of, e.g., a manufactured product (12a and 12b).

The second machine learning system (60) may performing an instance segmentation of the manufactured products (12a and 12b) on the conveyer belt. The conversion unit (80) may then infer an exact position of the manufactured products (12a and 12b) based on the instance segmentation. The actuator (10) may then be controlled depending on the determined position of the manufactured product (12a and 12b) for a subsequent manufacturing step of the manufactured product (12a and 12b). For example, the actuator (10)

may be controlled to cut the manufactured product at a specific location of the manufactured product (12a and 12b) itself.

Figure 6:
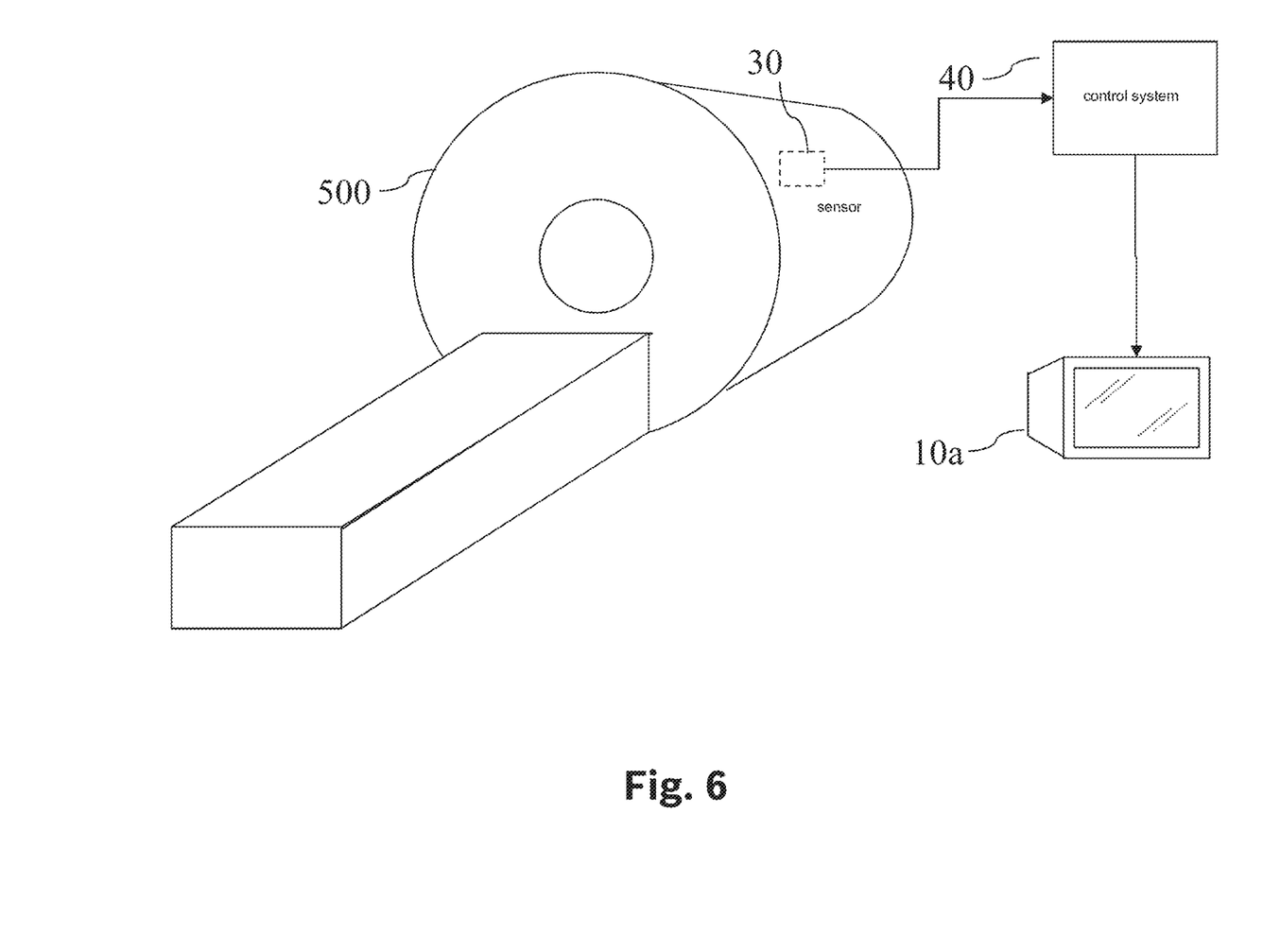
FIG. 6 shows the control system controlling a medical analysis system, according to an example embodiment of the present invention.

FIG. 6 shows an embodiment of a medical imaging system (500) controlled by the control system (40). The imaging system may, for example, be an MRI apparatus, x-ray imaging apparatus or ultrasonic imaging apparatus. The sensor (30) may, for example, be an imaging sensor which takes at least one image of a patient, e.g., displaying different types of body tissue of the patient.

The second machine learning system (60) may then determine a semantic segmentation of at least a part of the sensed image. The at least part of the image is hence used as input image (x) to the second machine learning system (60).

The control signal (A) may then be chosen in accordance with the classification, thereby controlling a display (10a). For example, the second machine learning system (60) may be configured to detect different types of tissue in the sensed image, e.g., by classifying the tissue displayed in the image into either malignant or benign tissue. This may be done by means of a semantic segmentation of the input image (x) by the second machine learning system (60). The control signal (A) may then be determined to cause the display (10a) to display different tissues, e.g., by displaying the input image (x) and coloring different regions of identical tissue types in a same color.

In further embodiments (not shown) the imaging system (500) may be used for non-medical purposes, e.g., to determine material properties of a workpiece. In these embodiments, the second machine learning system (60) may be configured to receive an input image (x) of at least a part of the workpiece and perform a semantic segmentation of the input image (x), thereby classifying the material properties of the workpiece. The control signal (A) may then be determined to cause the display (10a) to display the input image (x) as well as information about the detected material properties.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N. It may also be understood that elements of the plurality can be accessed by their index.

What is claimed is:

1. A computer-implemented method for training a first machine learning system, wherein the first machine learning system is configured to generate an output characterizing a label map of an image, the method comprising the following steps:
   providing a first input and a second input, wherein the first input characterizes a binary vector characterizing respective presences or absences of classes from a plurality of classes, and wherein the second input characterizes a randomly drawn value;
   determining, by a first generator of the first machine learning system, an output based on the first input and the second input, wherein the output characterizes a first label map, the first label map characterizing probabilities for the classes from the plurality of classes;
   determining a representation of the first label map using a global pooling operation;
   training the first machine learning system based on a loss function, wherein the loss function characterizes an F1 loss, wherein the F1 loss characterizes a difference between the first input and the representation of the first label map.

2. The method according to claim 1, wherein the F1 loss is a macro F1 loss.

3. The method according to claim 1, wherein the macro F1 loss is a double-sided macro soft F1 loss.

4. The method according to claim 1, wherein the presence or absence of the classes from the plurality of classes in the first input is determined based on label maps of a training dataset of the first machine learning system.

5. The method according to claim 4, wherein the first machine learning system is trained based on a plurality of first inputs, wherein the steps are carried out for each first input from the plurality of first inputs and wherein the plurality of first inputs comprises first inputs that characterize combinations of presences and absences of the classes, which are not observed in the label maps of the training dataset or are rarely observed in the training dataset.

6. The method according to claim 1, wherein the first generator is part of a conditional GAN comprised in the first machine learning system, wherein the first generator is trained based on a conditional GAN loss and the F1 loss.

7. The method according to claim 1, wherein the first machine learning system further includes a second generator, wherein the second generator is configured to determine an image based on an output determined from the first generator.

8. A computer-implemented method for determining a training dataset and/or test dataset including pairs of images and label maps, the method comprising:
   determining at least one pair of image and label map including the following steps:
      generating an output from a first machine learning system, wherein the first machine learning system the first machine learning system is configured to generate an output characterizing a label map of an image, wherein the first machine leaning system is trained by:
         providing a first input and a second input, wherein the first input characterizes a binary vector characterizing respective presences or absences of classes from a plurality of classes, and wherein the second input characterizes a randomly drawn value;
         determining, by a first generator of the first machine learning system, an output based on the first input and the second input, wherein the output characterizes a first label map, the first label map characterizing probabilities for the classes from the plurality of classes;
         determining a representation of the first label map using a global pooling operation;
         training the first machine learning system based on a loss function, wherein the loss function characterizes an F1 loss, wherein the F1 loss characterizes a difference between the first input and the representation of the first label map;
      providing the output as a label map; and
      determining the image based on the label map.

9. A computer-implemented method for training a second machine learning system, wherein the second machine learning system is configured to determine an output signal characterizing a label map, wherein: (i) the second machine learning system is trained using a training dataset, and/or (ii)

the second machine learning system is tested using a test dataset, wherein the training dataset and/or test dataset has been determined by:
- determining at least one pair of image and label map including the following steps:
  - generating an output from a first machine learning system, wherein the first machine learning system the first machine learning system is configured to generate an output characterizing a label map of an image, wherein the first machine leaning system is trained by:
    - providing a first input and a second input, wherein the first input characterizes a binary vector characterizing respective presences or absences of classes from a plurality of classes, and wherein the second input characterizes a randomly drawn value;
    - determining, by a first generator of the first machine learning system, an output based on the first input and the second input, wherein the output characterizes a first label map, the first label map characterizing probabilities for the classes from the plurality of classes;
    - determining a representation of the first label map using a global pooling operation;
    - training the first machine learning system based on a loss function, wherein the loss function characterizes an F1 loss, wherein the F1 loss characterizes a difference between the first input and the representation of the first label map;
  - providing the output as a label map; and
  - determining the image based on the label map.

10. A computer-implemented method for determining a control signal of an actuator and/or a display, wherein the control signal is determined based on an output signal determined from a second machine learning system, wherein the second machine learning system has been trained using a training dataset, wherein the training dataset has been determined by:
- determining at least one pair of image and label map including the following steps:
  - generating an output from a first machine learning system, wherein the first machine learning system the first machine learning system is configured to generate an output characterizing a label map of an image, wherein the first machine leaning system is trained by:
    - providing a first input and a second input, wherein the first input characterizes a binary vector characterizing respective presences or absences of classes from a plurality of classes, and wherein the second input characterizes a randomly drawn value;
    - determining, by a first generator of the first machine learning system, an output based on the first input and the second input, wherein the output characterizes a first label map, the first label map characterizing probabilities for the classes from the plurality of classes;
    - determining a representation of the first label map using a global pooling operation;
    - training the first machine learning system based on a loss function, wherein the loss function characterizes an F1 loss, wherein the F1 loss characterizes a difference between the first input and the representation of the first label map;
  - providing the output as a label map; and
  - determining the image based on the label map.

11. A first machine learning system configured to generate an output characterizing a label map of an image, the first machine learning system being trained by:
- providing a first input and a second input, wherein the first input characterizes a binary vector characterizing respective presences or absences of classes from a plurality of classes, and wherein the second input characterizes a randomly drawn value;
- determining, by a first generator of the first machine learning system, an output based on the first input and the second input, wherein the output characterizes a first label map, the first label map characterizing probabilities for the classes from the plurality of classes;
- determining a representation of the first label map using a global pooling operation;
- training the first machine learning system based on a loss function, wherein the loss function characterizes an F1 loss, wherein the F1 loss characterizes a difference between the first input and the representation of the first label map.

12. A training system configured to train a first machine learning system, wherein the first machine learning system is configured to generate an output characterizing a label map of an image, the training system configured to:
- provide a first input and a second input, wherein the first input characterizes a binary vector characterizing respective presences or absences of classes from a plurality of classes, and wherein the second input characterizes a randomly drawn value;
- determine, by a first generator of the first machine learning system, an output based on the first input and the second input, wherein the output characterizes a first label map, the first label map characterizing probabilities for the classes from the plurality of classes;
- determine a representation of the first label map using a global pooling operation;
- train the first machine learning system based on a loss function, wherein the loss function characterizes an F1 loss, wherein the F1 loss characterizes a difference between the first input and the representation of the first label map.

13. A non-transitory machine-readable storage medium on which is stored a computer program configured to train a first machine learning system, wherein the first machine learning system is configured to generate an output characterizing a label map of an image, the computer program, when executed by a computer, causing the computer to perform the following steps:
- providing a first input and a second input, wherein the first input characterizes a binary vector characterizing respective presences or absences of classes from a plurality of classes, and wherein the second input characterizes a randomly drawn value;
- determining, by a first generator of the first machine learning system, an output based on the first input and the second input, wherein the output characterizes a first label map, the first label map characterizing probabilities for the classes from the plurality of classes;
- determining a representation of the first label map using a global pooling operation;
- training the first machine learning system based on a loss function, wherein the loss function characterizes an F1 loss, wherein the F1 loss characterizes a difference between the first input and the representation of the first label map.

* * * * *